July 11, 1967

H. E. ERIKSON 3,330,953

X-RAY FILM CASSETTE FOR BACK-REFLECTION LAUE EXPOSURES
HAVING FILM INSERTION AND REMOVAL MEANS

Filed Sept. 21, 1964

INVENTOR.
Herman E. Erikson
BY Brown and Mikulka
and
Charles S. M<sup>c</sup>Guire
ATTORNEYS

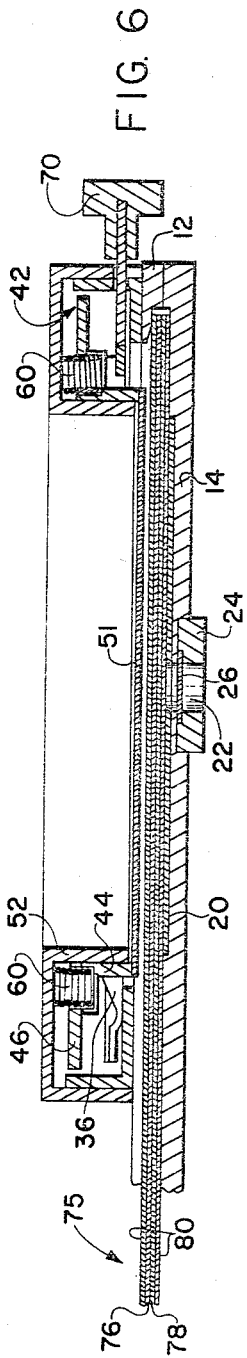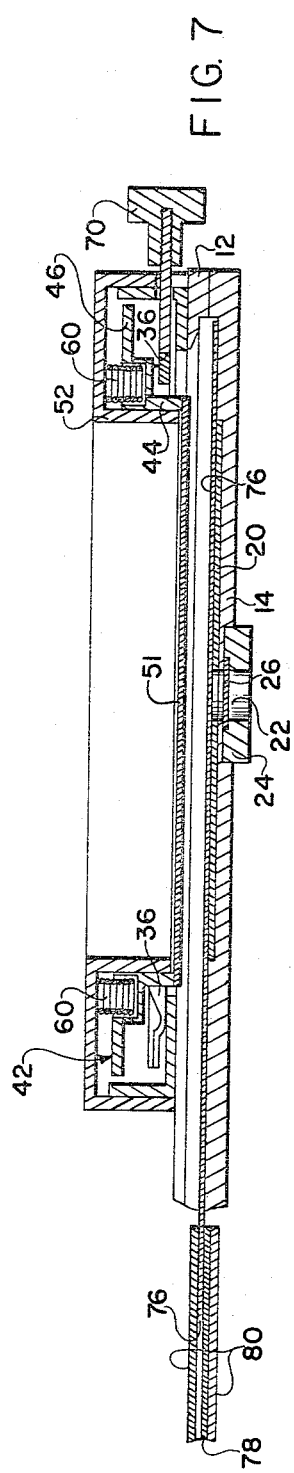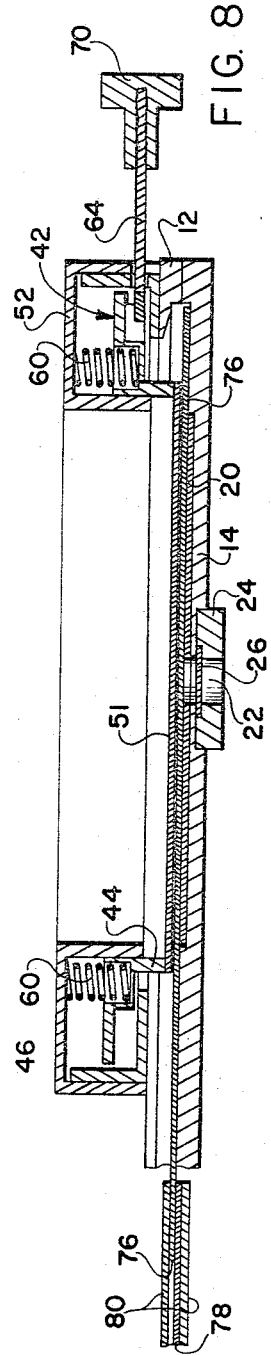

3,330,953
X-RAY FILM CASSETTE FOR BACK-REFLECTION
LAUE EXPOSURES HAVING FILM INSERTION
AND REMOVAL MEANS
Herman E. Erikson, Winchester, Mass., assignor to Polaroid Corporation, Cambridge, Mass., a corporation of Delaware
Filed Sept. 21, 1964, Ser. No. 397,938
9 Claims. (Cl. 250—68)

The present invention relates to X-ray photography, and more specifically to film-holding cassettes especially useful in X-ray crystallography.

A common technique used in making X-ray exposures for various purposes is known as back-reflection Laue photography. One useful application of this technique, for example, is the determination of crystal structures and orientation. The X-ray beam is directed through an opening, usually at the center of the film and the cassette, to impinge upon the crystal, positioned on the opposite side of the film and cassette from the X-ray tube. At least a portion of the X-rays are reflected by the crystal back upon the film in a pattern indicative of the structure and orientation of the crystal. After exposure in this manner, the film is removed from the cassette and developed in the usual way. It is then necessary to reconstruct the portion of the film which was removed so that precision measurements of the pattern may be taken from a reference position, normally the axis of the X-ray beam.

It is a principal object of the invention to provide novel film-holding means which permit X-ray exposures to be made, processed and analyzed with speed, accuracy and simplicity.

A further object is to provide apparatus for holding a photosensitive sheet during exposure to X-rays wherein the barrier against visible light may be flexible and the X-rays may pass through both the sheet and light barrier when making so-called back-reflection Laue exposures.

Another object is to provide apparatus for holding conventional photographic film packets of a type presently in commercial use which permits X-ray exposures, including back Laue exposures, to be made on a photosensitive portion of the packet.

A still further object is to provide a novel combination of photosensitive film and film-holding apparatus wherein back Laue exposures may be made without the necessity of making a hole in the film or the barrier which protects the film from visible light.

Still another object is to provide a novel X-ray cassette having a thin, flexible light barrier which attenuates X-rays passing therethrough by a minimal amount and including means for holding the film flat against the intensifying screen of the cassette.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 6–8 are a series of side elevational views in section through the longitudinal center of the apparatus, illustrating a series of steps in preparing for an exposure;

One of the elements of the invention, in the embodiments described herein, is a previously known item of photographic equipment presently manufactured by Polaroid Corporation, Cambridge, Massachusetts, and known as the Land 4 x 5 Film Holder No. 500. This film holder may be utilized to position for exposure, and subsequently assist in the development of a film assemblage in the form of a packet including a lighttight envelope for enclosing the photosensitive sheet. Film packets of the type described are known as "self-developing" film packets, a specific example being those manufactured by Polaroid Corporation and known as Land Film Packets, Type 52, 53, 57, 510, etc. Both the film holder and packets are described in detail in U.S. Patent No. 2,933,993 of Albert J. Bachelder et al., issued April 26, 1960. Although not limited to employment with film holders and packets of this specific type, the present invention will be so described since the technique of rapid exposure, development and analysis with which the invention is concerned is best achieved through the use of such. It is therefore to be understood that the invention may be practised with any suitable photosensitive medium with the basic film-holding means comprising a previously known cut film holder.

Figure 1:
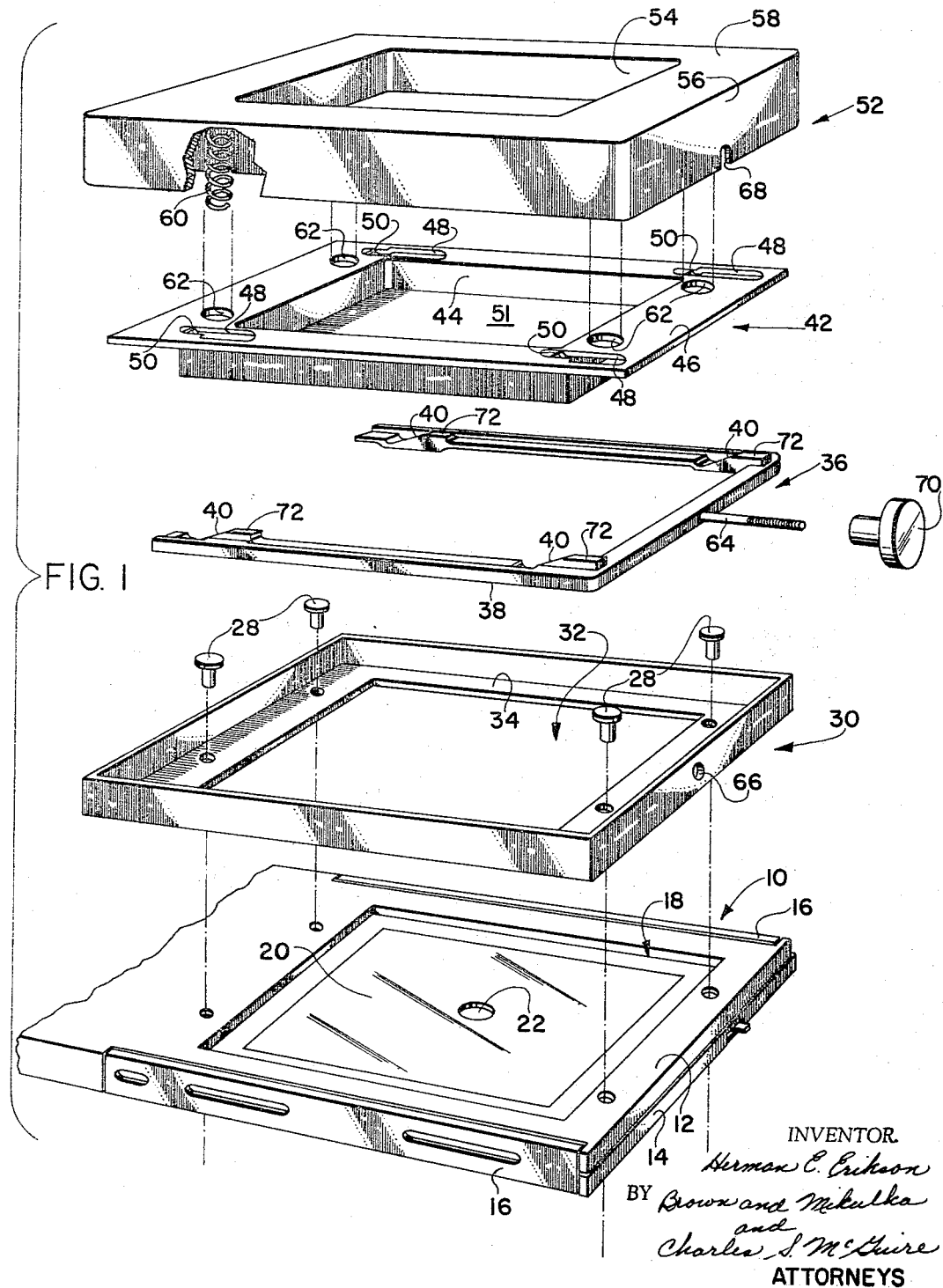
FIGURE 1 is an exploded perspective view of one embodiment of the apparatus of the invention, with portions broken away.

Accordingly, film holder 10, shown fragmentarily in FIGS. 1, 2, 4 and 6–8, comprises basically a film holder of the type described in the aforementioned Patent No. 2,933,993, with certain modifications described hereinafter which may be incorporated after manufacture of the holder in the usual manner. Film holder 10 includes upper and lower body portions 12 and 14, respectively, which may be retained in engagement by any suitable means such as clamps 16 which engage marginal edges of the two body portions. Suitable spacer means are included to maintain a space between the interior opposing surfaces of body portions 12 and 14, as may be best seen in FIGS. 6–8, thereby permitting insertion of the film packet described hereinafter between the body portions. Upper body portion 12 includes a rectangular opening 18 which forms the exposure opening for a photosensitive film positioned within holder 10, as will appear more fully hereinafter. A rectangular intensifying screen 20 is inserted into a recess which may be formed in lower body portion 14 so that the surface of the screen seen in FIGURE 1 is flush with the interior surface of body portion 14. A circular opening 22 extends through body portion 14 and intensifying screen 20 of holder 10. Bushing 24, seen in FIGS. 6–8, encircles opening 22 and is fixedly secured to body portion 14 by any appropriate fastening means. Light seal 26 is inserted between bushing 24 and body portion 14 and preferably comprises a relatively thin material opaque to visible light and transparent to X-rays. The thickness and consistency of the material of light seal 26 should be such that an X-ray beam passing therethrough is not significantly attenuated by the light seal. Black acetate plastic in the order of 0.005" thick has been found suitable for this purpose. The addition of intensifying screen 20, opening 22, bushing 24, and light seal 26, and the repositioning of an internal linkage and stop mechanism (not shown, but pointed out in more detail hereinafter) are the only alterations which are performed on the standard Land 4 x 5 Film Holder No. 500, in forming film holder 10 of the present embodiment of this invention. Although shown somewhat diagrammatically and fragmentarily in the present drawings, it is again pointed out that a complete description of the Land 4 x 5 Film Holder No. 500 is to be found in U.S. Patent No. 2,933,993. Additional descriptive material relating to this film holder and the film assemblage or packet intended for use therein may be found in U.S. Patent No. 3,119,317 of Dexter P. Cooper Jr., et al. issued January 28, 1964, wherein the subject holder and film packet are described in combination with other apparatus in a further modification of the method of use of the holder and film packet.

Fixedly attached to film holder 10 by means of rivets 28 is frame 30, having a rectangular opening 32, conforming substantially in size to and positioned congruently with opening 18, bounded by surface 34. U-shaped slide member 36 is seated with its lower surface 38 in sliding contact with surface 34 of frame 30. The upper portion of slide member 36 includes cam surfaces 40 disposed at an angle to the direction of sliding movement of slide member 36 upon surface 34.

Retaining frame 42 includes vertically disposed rectangular wall 44 and horizontally disposed wall 46 extending outwardly from the upper edge of wall 44. Wall 46 includes elongated openings 48, in a portion of each of which are rotatably mounted small rollers 50. The outside dimensions of vertically disposed wall 44 are such that it is adapted to extend through opening 32 of frame 30 and exposure opening 18 of film holder 10. The outside dimensions of horizontally disposed wall 46 are such that retaining element 42 will fit within the vertically disposed walls of frame 30, as may be seen in FIGS. 6–8. Light barrier 51 is made of a material with characteristics similar to light barrier 26; for this application a .004" thick triacetate sheet is well suited. Barrier 51 is secured to element 42 to extend across and block the rectangular opening defined by vertically disposed wall 44.

Cover element 52 includes interior vertically disposed side wall 54, and exterior vertically disposed side wall 56, connected by horizontally disposed wall 58 to form an element of U-shaped cross section. Cover element 52 is arranged to lie in covering relationship to retaining element 42 to prevent entry of light into holder 10 between the portion of holder 10 bounding exposure opening 18 and wall 44 of element 42. Wall 54 of the cover element defines a central opening in registration with the exposure opening in the film holder and that defined by wall 44 of element 42. Positioned between vertically disposed walls 54 and 56 are springs 60, one of which may be seen in FIGURE 1 where a fragment of exterior, vertically disposed wall 56 has been cut away. Spring seats 62 are formed in horizontally disposed wall 46 of retaining element 42. The spring seats comprise openings slightly larger than the outside diameter of springs 60 extending through only a portion of the thickness of wall 46.

Figure 2:
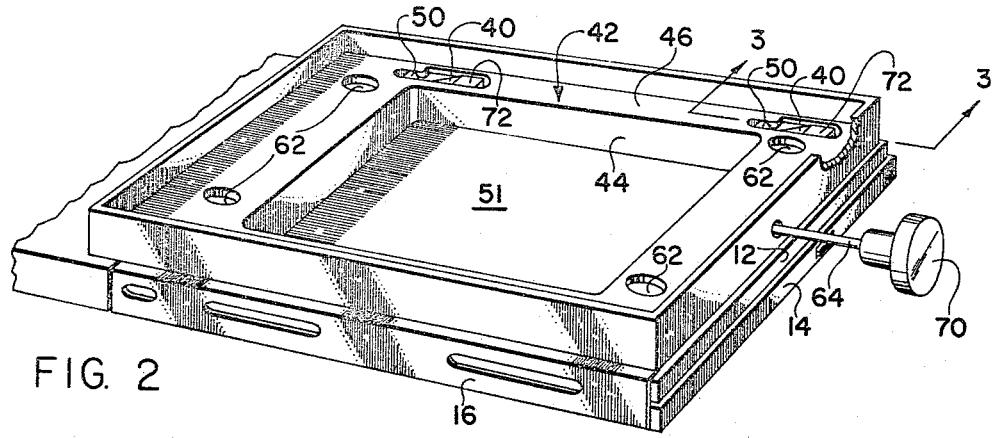
FIG. 2 is a perspective view of the apparatus of FIGURE 1 showing certain movable elements in a first position.
Figure 3:
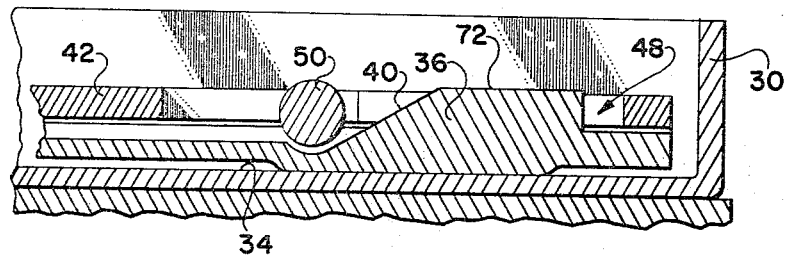
FIG. 3 is an enlarged, fragmentary, side elevational view in section on the line 3—3 of FIG. 2.

When the apparatus of FIGURE 1 is assembled stem 64, which is fixedly attached to slide element 36, extends through opening 66 in frame 30 and through cutaway portion 68 of cover element 52. Knob 70 is then affixed to the end of stem 64, thereby allowing reciprocal sliding movement of sliding element 36 upon surface 34 of frame 30. In FIG. 2 the elements are shown assembled with cover element 52 removed and knob 70 moved outwardly from the apparatus, whereby slide element 36 is moved to the right as seen in this figure. An enlarged side sectional view of a portion of the apparatus is shown in FIG. 3 with the elements in the position of FIG. 2, i.e., with slide element 36 moved toward the right. Here it may be seen that roller 50 of retaining element 42 is positioned adjacent the lower end of cam surface 40. The upper portion of cam surface 40, which terminates in conjunction with horizontally disposed surface 72, extends through an enlarged portion of elongated opening 48.

Figure 4:
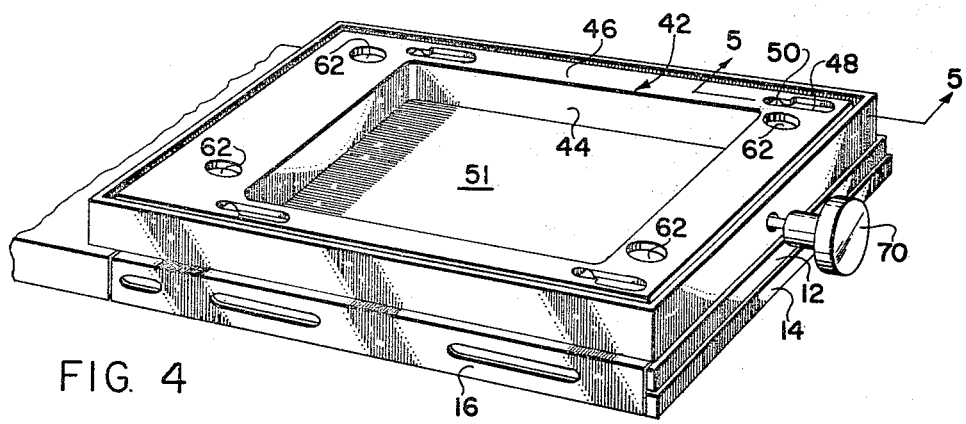
FIG. 4 is a perspective view, as in FIG. 2, showing the movable elements in a second position.
Figure 5:
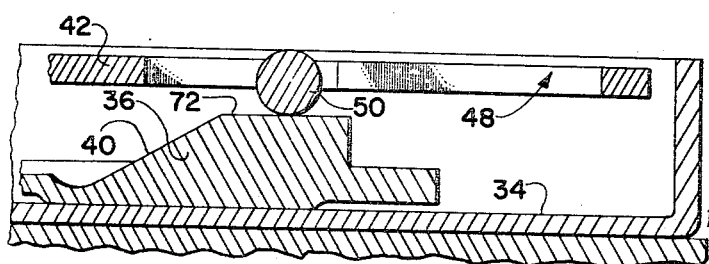
FIG. 5 is a side elevational view, as in FIG. 3, in section on the line 5—5 of FIG. 4.

Movement of knob 70 from the position shown in FIG. 2 to that shown in FIG. 4 moves slide 36 along surface 34 from the FIG. 3 to the FIG. 5 position. Element 42 is restrained against horizontal movement by the rather close fit of wall 46 within frame 30. Thus, as slide 36 is moved toward the left, as seen in FIGS. 3 and 5, roller 50 rides up cam surface 40 and element 42 is moved vertically against the force of springs 60. After movement of slide 36 to the FIG. 5 position, roller 50 rests on horizontal surface 72 of the slide, thus maintaining margin retaining element 42 in the upper position. Movement of knob 70 back to the FIG. 2 position causes movement of slide 36 back to the right and allows element 42 to return to the lower position under the force exerted by springs 60.

The operation of the above-described embodiment of the apparatus in conjunction with a film packet is illustrated in the side sectional views of FIGS. 6–8. The film packet, indicated generally by reference numeral 75, may comprise a Polaroid Land Series 50 film packet, manufactured by Polaroid Corporation, Cambridge, Massachusetts. Such packets include a single flexible sheet serving as a support for a photosensitive layer, indicated in the present drawings by the reference numeral 76, sometimes referred to hereinafter as the negative. Second sheet 78 is adapted to receive, upon proper chemical treatment, a positive transfer image from a developed photographic image formed in the photosensitive portion of sheet 76. Sheets 76 and 78 are initially arranged within opaque envelope 80 which protects the photosensitive portion from actinic light prior to exposure and which is slightly wider than sheets 76 and 78 to permit relative slidable movement of the sheets within the envelope. Such film packets also normally include an elongated liquid-carrying container holding a supply of a processing fluid adapted to be released from the container and spread between sheets 76 and 78 to effect development of a latent image formed in the photosensitive portion of sheet 76 and formation of a positive transfer image in sheet 78. Release of the processing fluid from the container and spreading it between the sheets to be processed is normally accomplished by manually advancing the film packet through a pair of pressure rolls which cause the container to rupture and the fluid to be released therefrom. The container, pressure rolls, etc., are not shown in the present drawings, being well known in the art and presently in wide commercial use.

When loading film packet 75 into the apparatus, knob 70 is moved to the left or inward position, as shown in FIG. 6, whereby retaining element 42 is in the upper position. The packet is inserted with the photosensitive surface of sheet 76 facing intensifying screen 20. Once the packet has been inserted within the lighttight interior of holder 10, sheet 78 and envelope 80 may be partially withdrawn to place negative 76 in position for exposure without interference from envelope 80 and sheet 78. This is accomplished, according to conventional construction of such film packets and holders, by attaching a clip to the right hand end (as shown in FIGS. 6–8) of negative 76. This end of envelope 80 is left open, but the clip is arranged to extend around the open end and provide a light shield for maintaining the film packet in a lighttight condition. When the packet has been fully inserted in the holder, as in FIG. 6, the clip is engaged by suitable detents or other such engagement means within holder 10. Envelope 80, to which sheet 78 is attached, may then be withdrawn toward the left to the position shown in FIG. 7. Negative 76 is retained in the position of FIG. 6 since it is attached to the clip which is engaged by the detent means within the holder. Suitable stop means may be provided for limiting the extent of withdrawal of envelope 80 and sheet 78. The stop means provided in the usual commercial embodiment of the film holder and packet comprise a movable, mechanical stop member in the holder and an element such as a piece of tape or cardboard on the outside of the envelope. The stop member is arranged to allow sliding insertion of the packet into the holder, but upon withdrawal of the envelope, with the clip and negative being held by the aforementioned detent means, the element thereon engages the stop means and prevents complete withdrawal of the envelope from the holder. After exposure and reinsertion of the envelope, the stop member is moved, through a linkage arrangement, out of the path of movement of the element on the envelope to allow complete withdrawal thereof from the holder. Since the film packet is inserted in the holder of the present invention with the photosensitive surface facing the intensifying screen, which is the reverse of the normal insertion for ordinary 4 x 5 photography in the usual commercial embodiment, either the stop mechanism in the holder or the element on the envelope must be reversed to the opposite side for proper operation. In the preferred embodiment of the invention, the stop member and linkage arrangement is moved to the opposite side of the holder to allow operation with commercially available film packets without modification thereof. The arrangement of the stop member on the opposite side of the holder is a simple mechanical expedient, well within the skill of the ordinary mechanic. The clip, detent means, stop means, etc., are not shown in the present drawings, being well known in the art, a full description being found in aforementioned U.S. Patent No. 2,933,993.

With the elements in the position of FIG. 7, negative 76 is in position for exposure with its photosensitive surface facing intensifying screen 20. The interior of holder 10 is maintained in a lighttight condition by cover 52 and light barriers 26 and 51. It is essential that during exposure the negative be held with its photosensitive surface flat and in continuous contact with the opposing surface of the intensifying screen. This is accomplished according to the present embodiment of the invention by moving knob 70 to the right or outward position, as shown in FIG. 8. This moves slide 36 toward the right and allows rollers 50 to move down cam surfaces 40 to the lower end thereof, as shown in FIG. 3. Springs 60 exert the necessary force on margin retaining element 42 for moving the latter to the position of FIG. 8. In this position the edges of vertically disposed side walls 44 of element 42 will engage negative 76 around the entire periphery of exposure opening 18, through which walls 44 extend. The clearance between rollers 50 and the lower ends of cam surfaces 40, as shown in FIG. 3, is provided to insure complete and continuous contact of the lower edges of walls 44 with negative 76. Light barrier 51, although preferably made of a thin, flexible sheet material, is stretched taut in the opening defined by side walls 44 and is also in contact with the negative. Thus, retaining element 42 and light barrier 51 act cooperatively to maintain the apparatus in a lighttight condition and to hold the negative flat against the intensifying screen during exposure.

With the elements in the position of FIG. 8 an X-ray beam may be directed through opening 22 to strike a crystal or other such object positioned on the opposite side of holder 10. The beam will pass through light barrier 26, negative 76, light barrier 51, strike the crystal and be reflected back through light barrier 51 and the negative 76 to impinge upon intensifying screen 20. The X-rays striking the screen cause the latter to emit light in the areas of impingement, thus exposing the adjacent photosensitive surface of the negative. Development of the resulting latent image reveals the structure or orientation of the crystal from which the X-ray beam has been reflected. After exposure in the above-described manner, knob 70 is again moved to the left or inward position, returning the elements to the position of FIG. 7. Retaining element 42 is now out of engagement with negative 76 so that envelope 80 may be reinserted over the negative with second sheet 78 in superposition therewith. The detents or other such holding means may then be released from the clip, leaving film packet 75 free to be drawn out of holder 10 and through appropriate pressure-applying means to effect release and spreading of the processing fluid and development of the exposed negative.

Figure 9:
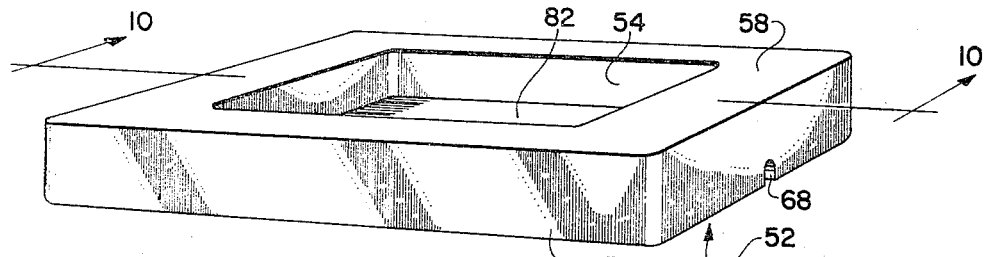
FIG. 9 is a perspective view of one element of the apparatus of FIGURE 1 including a modification according to a second embodiment of the invention.
Figure 10:
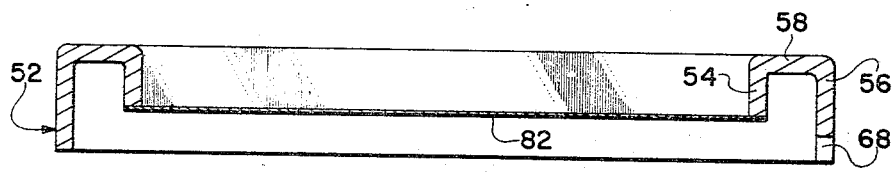
FIG. 10 is a side elevational view in section on the line 10—10 of FIG. 9.
Figure 11:
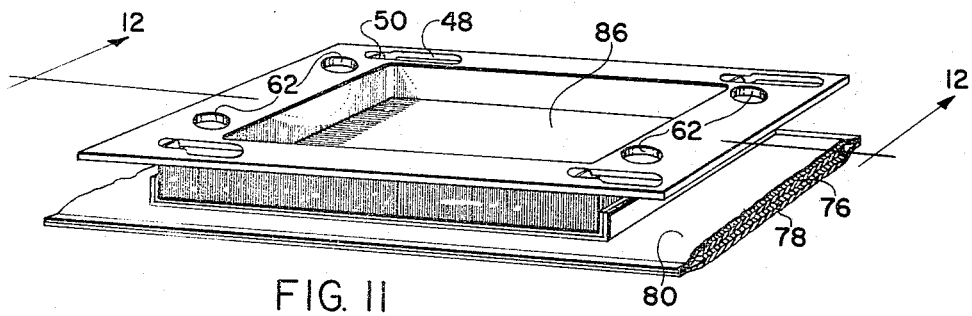
FIG. 11 is a perspective view of another element of the apparatus of FIGURE 1 modified according to the aforesaid second embodiment.

FIGS. 9–13 illustrate an alternate embodiment of the invention. The basic structure of holder 10, frame 30, slide 36, retaining element 42 and cover 52 remain the same as in the previously described embodiment and the same reference numerals are used to denote like parts in the present embodiment. Cover 52, as shown in FIGS. 9 and 10, includes light barrier 82 extending across the central opening. This barrier may be used in either the present or the previous embodiment in place of or in addition to light barrier 51.

Figure 12:
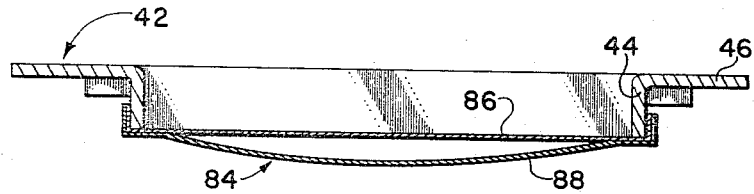
FIG. 12 is a side elevational view in section on the line 12—12 of FIG. 11.
Figure 13:
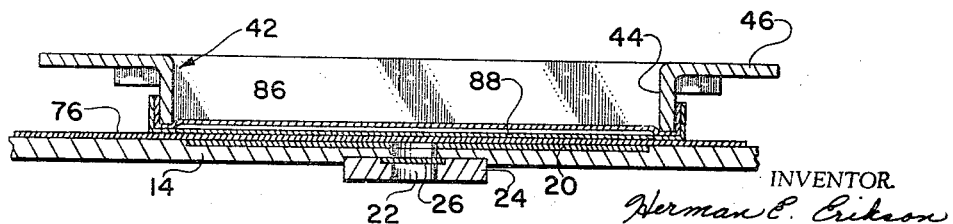
FIG. 13 is a side sectional view, as in FIG. 12, showing the elements in the film-retaining position.

Retaining element 42 includes a sealed, airtight bag 84 secured thereto in covering relation to the central opening defined by side walls 44. Bag 84 may conveniently be made of a material which may be laminated to itself at the edges to form an airtight space between wall 86, which is stretched taut across the opening, and wall 88. A quantity of air which is allowed to remain within bag 84 when the latter is sealed maintains wall 88 in spaced relation to wall 86. Retaining element 42 is moved to engage and disengage negative 76 as in the previous embodiment. In FIG. 12 bag 84 is shown in the free, or undistorted position which it assumes when retaining element 42 is in the upper position (as in FIGS. 6 and 7) out of contact with negative 76. FIG. 13 shows retaining element 42 in the lower position with wall 88 in contact with negative 76, thus compressing the bag and distorting wall 86 somewhat out of its initial plane. The positive air pressure within bag 84, produced by compressing the latter against negative 76, urges wall 88 into more firm contact with the negative over the entire area subject to exposure. Bag 84 is constructed of a material such as thin polyethylene or acetate plastic so as to allow passage of the X-ray beam therethrough with a minimum of dispersion. Bag 84 may also be transparent to visible light if opaque light barrier 82 is used, or one of the walls of the bag may be apaque to visible light and provide the necessary means for maintaining light tightness in the interior of holder 10 without using barrier 82.

It may thus be seen that the apparatus of the invention provides means for rapidly and precisely exposing and processing film in X-ray crystallography applications, for example, while using basic photographic apparatus and film packets which are presently comercially available. Back Laue exposures may be effected without the necessity of cuting a hole in the negative or providing the other special apparatus. Means are also provided for maintaining the cassette in a lighttight condition and for holding the negative in intimate contact with the intensifyng during exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Apparatus for holding photographic film for X-ray exposure comprising, in combination:
(a) a pair of substantially flat sections fastened together in fixed, superimposed, relationship to provide therebetween a semi-enclosed chamber having at one end an aperture adapted to slidable insertion and removal of said film;
(b) one of said sections including an exposure opening in registration with a photosensitive portion of said film;
(c) the other of said sections including an intensifying screen mounted in registration with said exposure opening;
(d) a film-retaining element having a depending wall portion defining a central opening, said portion being of a similar shape but slightly smaller than said exposure opening and adapted to extend through said exposure opening around the periphery thereof toward said film;
(e) means for moving said retaining element between a first position, whereat said portion extends through said exposure opening closely adjacent to said film and a second position whereat said portion is so remote from said film as to permit uninhibited slidable movement of said film into and out of said semi-enclosed chamber formed between said sections;
(f) light-barrier and film-flattening means attached at least in part to said portion of said film-retaining element defining said opening thereof so as to extend completely across said opening in a tautened condition and bear against said film at said first position of said film-retaining element, said light-barrier and film-flattening means being formed of a material readily-transmissive both to back- and front-reflected X-rays but at least in part opaque to visible light;
(g) a pair of collimating apertures formed, respectively, in a central portion of said other section and in a central portion of said intensifying screen aligned therewith to permit direct transmission of X-rays therethrough; and
(h) a sheet formed of a material readily transmissive of said X-rays but opaque to visible light positioned across at least one of said collimating apertures.

2. Apparatus, as defined in claim 1, wherein said light-barrier and film-flattening means is a unitary flexible sheet composed of a plastic material.

3. Apparatus, as defined in claim 1, wherein is included a cover element having a central opening substantially aligned with said exposure opening of said one section and said opening of said film-retaining element, said cover element being adapted to fit over and partially enclose said film-retaining element.

4. Apparatus, as defined in claim 3, wherein is included means for biasing said film-retaining element toward said first position and manually-actuatable cam means for moving said film-retaining element to said second position, against the bias applied by said biasing means.

5. Apparatus, as defined in claim 4, wherein said biasing means comprises a plurality of compression springs bearing, respectively, against substantially parallel horizontal surfaces of said cover element and said film-retaining element.

6. Apparatus, as defined in claim 4, wherein said cam means is in the form of a U-shaped member having a plurality of cam surfaces, slidably-movable in a direction substantially perpendicular to the direction of movement of said film-retaining element, on a frame element positioned intermediate of said film-retaining element and said sections and having a central aperture conforming substantially to that of said exposure opening of said one section.

7. Apparatus, as defined in claim 3, wherein said light-barrier and film-flattening means is a unitary element in the form of a sealed air-containing bag having a first wall stretched taut across said opening of said film-retaining element and a second wall adapted to contact said film and hold it in a flattened condition.

8. Apparatus, as defined in claim 3, wherein said light-barrier and film-flattening means is composed of two components, namely, a first light-barrier component positioned across said central opening of said cover element and a second film-flattening component positioned across said opening of said film-retaining means.

9. Apparatus, as defined in claim 8, wherein said film-flattening component is in the form of a sealed bag containing a compressible substance and adapted to contact said film and hold it in a flattened condition.

References Cited

UNITED STATES PATENTS

| | | | |
|---|---|---|---|
| 1,550,499 | 8/1925 | Buck | 250—68 |
| 2,371,843 | 3/1945 | Powers | 250—68 |
| 2,566,266 | 8/1951 | Uhle et al. | 250—68 |
| 2,904,688 | 9/1959 | Miller | 250—68 |
| 3,174,039 | 3/1965 | Frede et al. | 250—68 |

FOREIGN PATENTS

| | | |
|---|---|---|
| 236,164 | 7/1965 | Great Britain. |

RALPH G. NILSON, *Primary Examiner.*

A. L. BIRCH, *Assistant Examiner.*